United States Patent Office
3,558,690
Patented Jan. 26, 1971

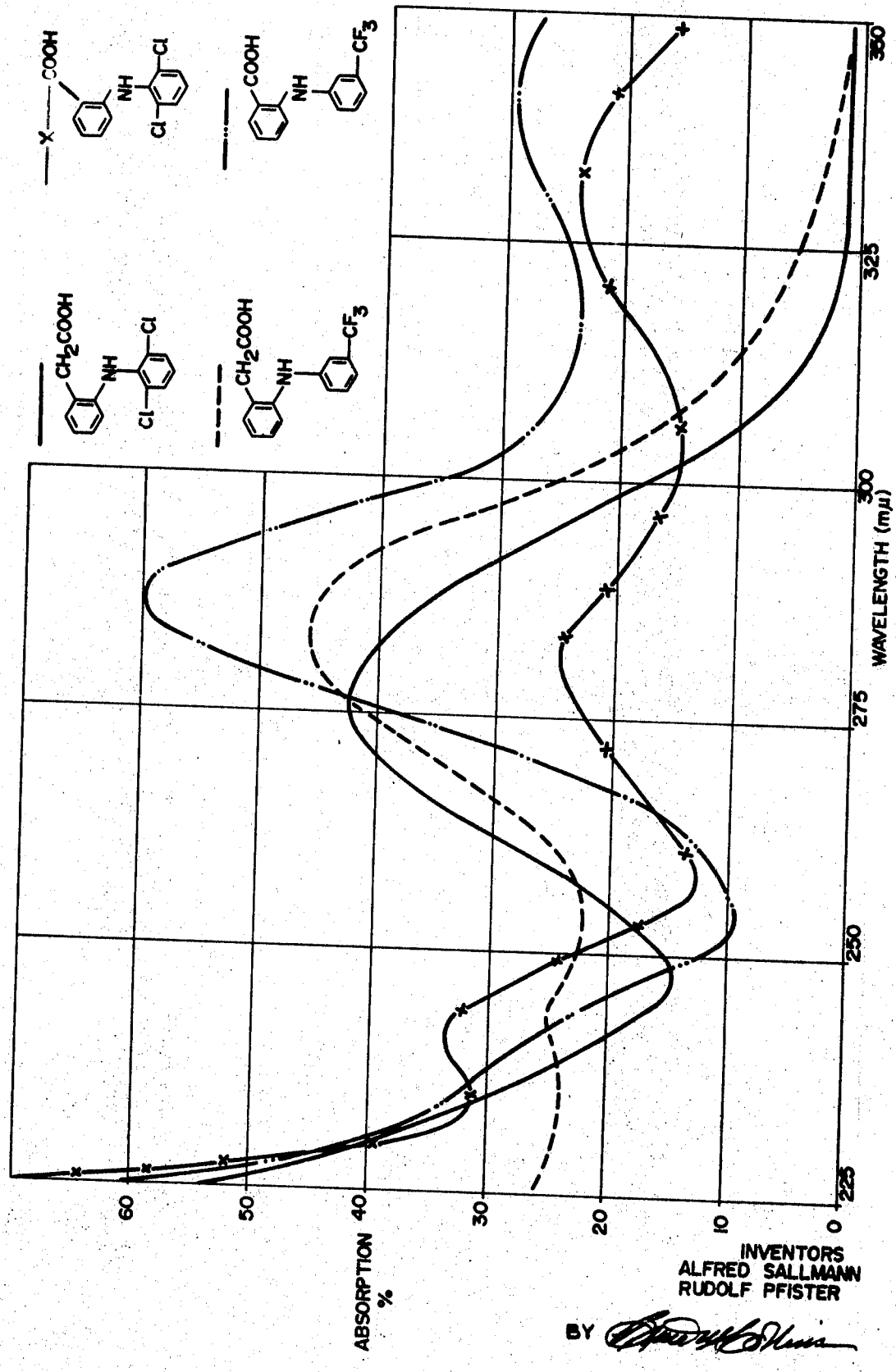

3,558,690
SUBSTITUTED DERIVATIVES OF 2-ANILINO-PHENYLACETIC ACIDS AND A PROCESS OF PREPARATION
Alfred Sallmann, Bottmingen, and Rudolf Pfister, Basel, Switzerland, assignors to Geigy Chemical Corporation, Ardsley, N.Y., a corporation of New York
Continuation-in-part of applications Ser. No. 782,206, and Ser. No. 782,473, both Dec. 9, 1968, and Ser. No. 625,326, Mar. 23, 1967. Said Ser. No. 782,206, being a continuation-in-part of said application Ser. No. 625,326, and Ser. No. 539,829, Apr. 4, 1966. This application Sept. 29, 1969, Ser. No. 861,571
Claims priority, application Switzerland, Apr. 8, 1965, 4,961/65; Feb. 25, 1966, 2,770/66; Mar. 30, 1966, 4,626/66; Dec. 20, 1967, 17,891/67, 17,892/67, 17,893/67
Int. Cl. C07c 101/44
U.S. Cl. 260—471
27 Claims

ABSTRACT OF THE DISCLOSURE

Substituted 2-anilinophenylacetic acids, their esters and salts have desirable absorption patterns for protecting the skin against the irritating effect of ultraviolet light. The compounds are also antiinflammatory agents. Typical embodiments are 2 - (2,6 - dichloroanilino)-phenylacetic acid, the sodium salt thereof and the methyl ester thereof.

CROSS REFERENCE

This is a continuation-in-part of copending applications Serial Nos. 782,206, 782,473 and 625,326 filed Dec. 9, 1968, Dec. 9, 1968 and Mar. 23, 1967 respectively, Ser. No. 782,206 itself being a continuation-in-part of said Ser. No. 625,326 and of Ser. No. 539,829, filed Apr. 4, 1966 and now abandoned. All of the above listed applications are now abandoned.

DETAILED DESCRIPTION

The present invention pertains to substituted 2-anilinophenylacetic acids, to salts and esters thereof, to methods of treating inflammatory conditions and of protecting skin against irritating ultraviolet light, to compositions adapted for these methods, and to novel synthetic methods for the preparation of these compounds.

In a first embodiment, the present invention pertains to 2-(2-substituted anilino)phenylacetic acids and -acetates of the formula:

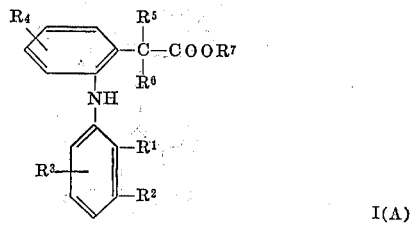

I(A)

wherein:

$R^1$ is (lower)alkyl, (lower)alkoxy, fluoro or chloro;
each of $R^2$ and $R^3$ is hydrogen, (lower)alkyl, chloro or fluoro;
$R^4$ is hydrogen, (lower)alkyl, (lower)alkoxy, chloro, fluoro or bromo;
$R^5$ is hydrogen or (lower)alkyl;
$R$ is hydrogen, (lower)alkyl or when $R^5$ is hydrogen, benzyl; and
$R^7$ is hydrogen, (lower)alkyl or benzyl.

The 2-(substituted anilino)phenylacetic acids and -acetates of this first embodiment will necessarily have a substituent in the 2-position of the anilino ring. This substituent, designated by $R^1$, is a (lower)alkyl, (lower)alkoxy, chloro or fluoro group, preferably methyl or chloro.

In a second embodiment, the present invention pertains to 2-(3-trifluoromethylanilino)phenylacetic acids and -acetates of the formula:

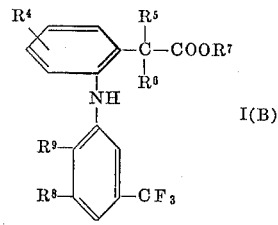

I(B)

wherein:

each of $R^4$, $R^5$, $R^6$ and $R^7$ is as defined above for Formula I(A);
$R^8$ is hydrogen or trifluoromethyl; and
$R$ is hydrogen or chloro.

In the compounds of Formula I(A) and (B) and in the present specification, the term (lower)alkyl means a straight or branched monovalent hydrocarbon chain of from 1 to 5 carbon atoms. The term (lower)alkoxy is defined as a (lower)alkyl connected through an ether oxygen link. Thus alkyl includes for example, methyl, ethyl, n-propyl, isopropyl, n-butyl, sec. butyl, and tert. butyl, preferably methyl or ethyl, while (lower)alkoxy includes for example, methoxy, ethoxy, n-propoxy, isopropoxy, n-butoxy, and isobutoxy, perferably methyl or ethyl.

The compounds of Formulas I(A) and I(B) absorb the irritating rays of ultraviolet light which are primarily responsible for sunburn, those of a wavelength of about 290 to about 300–315 millimicrons, while at the same time they do not absorb the desirable so-called "tanning" rays of over 315 millimicrons wavelength. These compounds are, therefore, especially useful as ultraviolet absorbers for cosmetic purposes, e.g., in sun-tan creams or lotions. The corresponding anthranilic acid derivatives, on the contrary, show a distinct and pronounced absorption of the desired "tanning" radiation. The diagram shown in the accompanying drawing illustrates the absorption of ultraviolet light of wavelengths in the "sunburn-causing" and "tanning" ranges of two preferred compounds according to the invention, on the one hand, and to structurally similar anthranilic acid derivatives, on the other hand.

The compounds advantageously also possess antiinflammatory, analgesic and antipyretic activity combined with a favorable therapeutic index. This activity can be observed in various standard pharmacological tests, as for example in the bolus alba test in rats, the UV-erythema test in guinear pigs, the cotton pellet test in rats, the phenylquinone stretch test in mice, etc. These properties render the compounds of the invention additionally suitable for the treatment of rheumatic, arthritic and other inflammatory conditions.

As an example of the anti-inflammatory activity of the compounds, the sodium salt of 2-(2,6-dichloroanilino)-phenylacetic acid demonstrates a significant inhibitory effect in bolus alba induced edema in the rat paw, described by G. Wilhelmi, Jap. Journ. Pharmac. 15, 190 (1965).

Topical sun-tan compositions according to the invention contain at least one compound of Formulas I(A) or I(B) or a pharmaceutically acceptable salt thereof with a base, in an amount which absorbs a sufficient amount of ultraviolet radiation having a wavelength in the range of from 290 to 315 millimicrons, as well as a carrier compatible with the compound or salt, the carrier being of a creamy to highly fluid consistency so as to provide an ointment, cream or oil.

When utilized primarily for their anti-inflammatory activity, the compounds of the present invention can also be administered orally, rectally or parenterally, in particular intramuscularly. The 2-(substituted anilino)phenylacetate esters falling under Formulas I(A) and I(B) are principally administered orally or rectally. Suitable pharmaceutical forms include solid and liquid unit oral dosage forms such as tablets, capsules, powders, suspensions, solutions, syrups and the like, including sustained release preparations, and fluid injectable forms such as sterile solutions and suspensions. The term dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the compound to a suitably fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions can be formulated by dispersing the medicament in a non-toxic vehicle in which it is insoluble.

For parenteral administration, fluid unit dosage forms can be prepared by suspending or dissolving a measured amount of the compound in a non-toxic liquid vehicle suitable for injection such as an aqueous or oleaginous medium. Alternatively a measured amount of the compound is placed in a vial and the vial and its contents are sterilized and sealed. An accompanying vial or vehicle can be provided for mixing prior to administration.

The daily dosages, to be taken internally, of compounds of Formulas I(A) or I(B) or pharmaceutically acceptable salts thereof with a base, for the treatment of rheumatic, arthritic and other inflammatory conditions is from about 50 to about 1500 mg. for adult patients, although the amounts administered depend upon the species, age and weight of the subject under treatment, as well as the particular condition to be treated and the mode of administration. Dosage units such as dragees, tablets or suppositories, preferably contain from about 25 to about 300 mg. of a compound of Formulas I(A) or I(B) or a pharmaceutically acceptable salt thereof. Unit dosages for oral administration preferably contain from 1% to 90% of an active ingredient of Formula I(A) or I(B).

Pharmaceutically acceptable salts of the acids falling under Formulas I(A) or I(B) are obtained either in the courses of the production of the acids as described hereafter, or via conventional methods, such as the mixing of preferably equimolar amounts of the free acid and the base in a suitable solvent, such as water, methanol, ethanol, diethyl ether, chloroform, methylene chloride or the like. Salts, which in certain solvents have an appreciably lower solubility than the alkali salts, can also be produced from the latter by double reaction. Pharmaceutically acceptable salts of the acids falling under Formulas I(A) and I(B) are such as derived from non-toxic inorganic or organic bases. Examples of such salts are the sodium, potassium, lithium, magnesium, calcium and ammonium salts, as well as salts with ethylamine, triethylamine, 2-aminoethanol, 2,2-iminodiethanol, 2-dimethylamino-ethanol, 2-diethylamino-ethanol, ethylenediamine, benzylamine, p-aminobenzoic acid, 2-diethylaminoethyl ester, pyrrolidine, piperidine, morpholine, 1-ethylpiperidine or 2-piperidino-ethanol, and the like. A particular advantage of the salts is that they tend to stabilize the acids falling under Formulas I(A) and I(B).

The compounds of the present invention can be prepared in a number of ways.

In a first process, a 2-(substituted anilino)phenylacetonitrile of the formula:

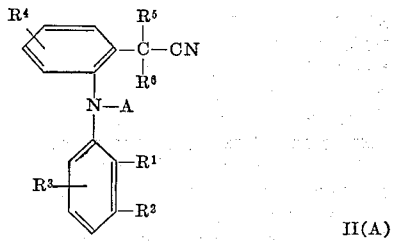

II(A)

or of the formula:

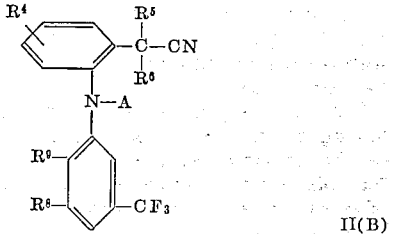

II(B)

wherein $R^1$, $R^2$, $R^3$, $R^4$, $R^5$, $R^6$, $R^7$, $R^8$ and $R^9$ are as defined above and A is hydrogen or a (lower)alkanoyl group, is treated with an alkali metal hydroxide in an aqueous solvent. Suitable solvents include aqueous lower alkanols such as ethanol, methanol or n-butanol, polyols such as ethylene glycol or dimethylformamide. The hydrolysis is performed at or slightly below the boiling temperature of the solvent, using at least two equivalents of an alkali metal hydroxide, in particular sodium or potassium hydroxide.

The 2-(substituted anilino)phenylacetonitriles of Formulas II(A) and II(B) where A is (lower)alkanoyl can also be converted into the corresponding phenylacetates wherein $R^7$ is (lower)alkyl through treatment of the nitrile with a (lower)alkanol in the presence of an acid catalyst. (Lower)alkyl and benzyl 2-(substituted anilino) phenylacetates can also be obtained from the corresponding free acids through standard esterification techniques. Conversely the (lower)alkyl 2 - (substituted anilino) phenylacetates can be saponified and the benzyl 2-(substituted anilino)phenylacetates hydrogenolysized with catalytically activated hydrogen to yield in both cases the corresponding 2-(substituted anilino)phenylacetic acids.

The starting materials of Formulas II(A) and II(B) are obtained from the corresponding 2-(substituted anilino)anthranilic acids or their (lower)alkyl esters through reduction with lithium aluminum hydride in ether or tetrahydrofuran, sodium borohydride in methanol, or sodium borohydride and lithium bromide in diglyme (diethylene glycol dimethyl ether). The resultant 2-(substituted anilino)benzylalcohols are then converted to the corresponding benzyl chlorides through treatment with acetyl chloride, with dry ethereal hydrogen chloride, or with thionyl chloride and dry pyridine in ether. These 2-(substituted anilino)benzyl chlorides are then treated with sodium or potassium cyanide to yield the requisite 2-(substituted anilino)phenylacetonitriles of Formulas II(A) or II(B).

The groups $R^5$ or $R^6$ can be introduced into a 2-(substituted anilino)phenylacetonitrile of Formula II(A) or II(B) wherein A is a (lower)alkanoyl group and $R^5$ and $R^6$ are hydrogen or into the corresponding 2-(substituted anilino)phenylacetic acid bearing an N-alkanoyl group, through conventional alkylation techniques, with the N-alkanoyl group subsequently being removed by alkaline hydrolysis.

In a second process an indolinone of the formula:

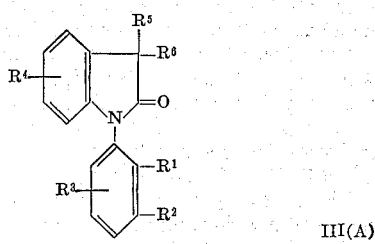

III(A)

is treated with at least one equivalent of an alkali metal hydroxide, alkali metal carbonate or alkaline earth metal hydroxide with heating and, if desired, the acid is liberated from the alkali or alkaline earth salt thus obtained. This acid can be converted into another salt with an organic or inorganic base if desired. Suitable solvents for this second process are, in particular, aqueous lower alkanols such as ethanol, methanol or n-butanol; ethylene glycol; or dimethylformamide. The hydrolysis is performed at or slightly under the boiling point of the solvent.

The indolinones of Formula III(A) are obtained from substituted N-phenylanilines (obtained for example from optionally substituted o-chloro- or o-bromo- benzoic acids and substituted anilines followed by decarboxylation of the o-anilino-benzoic acids formed, or by heating N,O-diaryl-iminoesters and hydrolysing the N,N-diarylamides formed by rearrangement, or by reacting an optionally substituted acetanilide with a bromobenzene substituted by a group corresponding to $R^4$) through the reaction of the substituted N-phenyl aniline with an α-chloroalkanoic acid chloride, e.g., chloroacetyl chloride, 2-chloropropionyl chloride and the like, to yield an N-(α-chloroalkanoyl) (N-substituted phenyl)aniline. This is then heated with aluminum chloride as a melt at temperatures of about 160° C.

The substituents $R^5$ and $R^6$ can also be directly introduced into an indolinone of Formula III(A). Thus an indolinone of formula III(A) wherein $R^5$ and $R^6$ are hydrogen is treated with an alkyl halide or dialkyl sulfate in the presence of sodium hydride or sodium amide in dimethylformamide, or with an aralkyl halide, such as benzyl chloride. A benzyl radical is also introduced into such an indolinone by reacting the latter with benzaldehyde and then reducing the 1-aryl-3-benzal-2-indolinone formed; e.g., with activated hydrogen.

In a third process an N-substituted indol-2,3-dione of the formula:

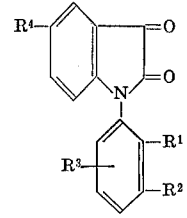

IV(A)

or of the formula:

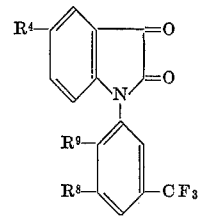

IV(B)

wherein $R^1$, $R^2$, $R^3$, $R^4$, $R^8$ and $R^9$ are as previously defined, is treated first with hydrazine or a semicarbazide and then with an alkali hydroxide or alkali metal alcoholate. This process is carried out by either first converting the substituted indole-2,3-dione with hydrazine, which can also be used in the form of the hydrate, or with semicarbazide to the corresponding 3-(hydrazone) or 3-(semicarbazone), respectively, and decomposing this intermediate with an alkali metal hydroxide or alkali metal alkoxides or by mixing and reacting all three reaction components simultaneously. The temperature for the main reaction, the action of the alkali metal hydroxide or alkali metal alkoxide, is in the range of 100–220°, preferably from 140–200°. The optional prior and separate formation of the hydrazone can be carried out at considerably lower temperatures, e.g., at room temperature; it can however also be conducted at higher temperatures. Water which may be introduced when the hydrazine hydrate is used or that which is liberated by the reaction, can be removed by distillation. A higher boiling organic solvent can be used as reaction medium. Such solvents include ethylene glycol (or mono- and di- ethers thereof such as diethylene glycol, diethylene glycol monomethylether) or triethylene glycol, higher boiling alcohols such as benzyl alcohol, octyl alcohol or nitrilotriethanol, or when the reaction is carried out in a closed vessel, a (lower)alkanol. It is also possible when employing a (lower)alkanol solvent such as ethanol or butanol as the initial reaction medium, to remove this solvent during the reaction together with excess hydrazine and liberated water until the reaction mixture gradually solidifies, reaching a temperature between 150° and 200°. The alkali metal hydroxides which can be used in this third process are, in particular, potassium or sodium hydroxide. The alkali metal alkoxides include sodium alkoxide and are either derivatives of (lower)alkanol solvent or of the higher boiling hydroxy compounds used as reaction media.

The alkali metal salts of substituted phenylacetic acids of Formula I(A) or I(B) that are first obtained according to this process are optionally converted into the free acid in the usual manner using strong acids, e.g., hydrochloric acid. If desired, the acid obtained is converted into another salt, preferably a pharmaceutically acceptable salt, with an inorganic or organic base, according to processes mentioned hereinbefore.

In converting the ring-substituted indol-2,3-diones of Formula IV(A) or IV(B) into the corresponding phenylacetic acids, the process can be carried out through an additional intermediate stage, namely the production of the 2-(substituted anilino)phenylglyoxylic acid of Formulas V(A) and V(B).

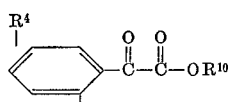

V(A)

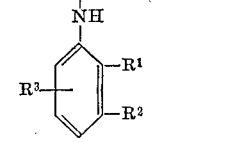

V(B)

wherein $R^1$, $R^2$, $R^3$, $R^4$, $R^8$ and $R^9$ are as previously defined and $R^{10}$ is hydrogen or a cation.

Thus a compound of Formula IV(A) or IV(B) is initially subjected to hydrolysis and 2-(substituted anilino) phenylglyoxylic acid or its salt is then reduced with hydrazine or semicarbazide and with an alkali metal hydroxide or alkali metal alkoxide as previously described.

The third method is especially advantageous both in terms of its yield and of its application. Thus in the second method described above, the relatively high temperatures utilized in the aluminum chloride ring closure can lead to a number of undesirable side reactions, including loss or exchange of fluoro in trifluoromethyl groups, migration of alkyl groups and splitting of alkoxy groups. Such are avoided in the preparation of the indol-2,3-diones of Formulas IV(A) and IV(B) as can be seen in the following description of these starting materials. Thus a substituted N-phenylaniline, obtained for example as previously described, is treated with oxalyl chloride to yield a substituted N-phenyl oxanilic acid of the formula:

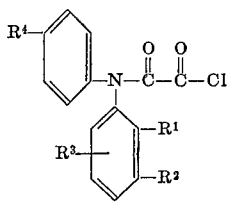

VI(A)

or of the formula

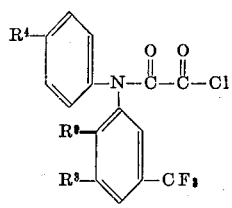

VI(B)

wherein $R^1$, $R^2$, $R^3$, $R^4$, $R^8$ and $R^9$ are as previously defined.

These oxanilic acid chlorides can then be converted into the corresponding indol-2,3-diones of Formulas IV(A) and IV(B) respectively, through the use of aluminum chloride, the reaction being conducted however at room temperature.

Yields are further improved if the indol-2,3-dione is purified, as through recrystallization, prior to treatment with hydrazine or a semicarbazide.

As previously described, the 2-(substituted anilino)-phenylacetic acids of Formula I(A) and I(B) can be esterified to yield the corresponding acetates through the use of conventional techniques. These includes the use of a lower diazoalkane, such as diazomethane, in an inert organic solvent such as ether, methylene chloride, benzene, acetals of N,N-dimethylformamide, i.e., 1,1-diethoxytrimethylamines or 1,1-diaralkoxytrimethylamines, etc.; the use of benzyl alcohol or (lower)alkanols in the presence of N,N-dimethyl formaldehyde dineopentyl acetal, i.e., 1,1-dineopentyloxytrimethylamine; the raction of an alkali salt of an acid falling under Formulas I(A) or I(B) and a reactive ester of a (lower)alkanol or benzyl alcohol, e.g., with dimethylsulfate, diethylsulfate, methyl iodide, ethyl iodide, propyl bromide, butyl bromide, benzyl chloride, benzyl bromide or p-toluenesulfonic acid methyl ester in a suitable reaction medium; and the reaction of an acid falling under Formulas I(A) or I(B) with a mixture consisting of the alcohol desired as ester component and thionyl chloride. In this last method, the maintenance of low temperatures, e.g., below about $-5°$, is advantageous.

The following examples set forth the manner and process of making typical embodiments of the invention, without being a limitation thereof, and include the best mode contemplated by the inventors for carrying out the invention. In these examples, temperatures are expressed on the centigrade scale.

EXAMPLE 1

2-(2,6-dichloro-3-methylanilino)phenylacetic acid (A) N-phenyl-2,6-dichloro-3-methylaniline: Seven grams of 2-(2,6-dichloro-3-methylanilino)benzoic acid [alternatively named as N-(2,6-dichloro-m-tolyl)-anthranilic acid] are heated for 2 hours at 280°. The cooled melt is dissolved in 30 ml. of benzene and the bnzene solution is extracted with 5 ml. of 2 N sodium carbonate and 5 ml. of water. The solution is dried with sodium sulfate and concentrated. The residue is distilled whereupon N-phenyl-2,6-dichloro-3-methylaniline (alternatively named as 2,6-dichloro-N-phenyl-m-toluidine) is obtained as a yellow oil, B.P. 115–120°/0.001 torr.

The following are obtained in a similar fashion from the corresponding anthranilic acids:

(a) N-phenyl-2,6-dichloroaniline, B.P. 109–111°/0.003 torr.

(b) N-phenyl-2-chloro-6-methylaniline, B.P. 88°/0.005 torr.

Alternatively, these substituted N-phenylanilines can be prepared according to the following procedures:

Forty milliliters of acetyl chloride are slowly added dropwise to a solution of 81 g. of 2,6-dichloraniline in 30 ml. of glacial acetic acid. The solution is then heated in a water bath until the development of hydrogen chloride has been completed. It is then cooled to room temperature and the mixture is poured into ice. The crystals which separate are filtered off and recrystallised from glacial acetic acid to yield N-acetyl-2,6-dichloraniline, M.P. 180–181°. The yield is 70% of the theoretical.

N-acetyl-2,6-dichloro-3-methylaniline M.P. 179–181° from glacial acetic acid/water, is prepared analogously.

Fifteen grams of N-acetyl-2,6-dichloroaniline (alternatively named as 2,6-dichlor-acetanilide) are dissolved in 150 ml. of bromobenzene. Five and a half grams of calcinated potassium carbonate and 0.5 g. of copper powder are added. The mixture is refluxed for 4 days, the water formed being removed by a water separator, cooled and subjected to steam distillation. The residue is extracted with 200 ml. of ether. The ether solution is filtered through Hyflo and the residue is concentrated to dryness under 11 torr. The residue is dissolved in 60 ml. of 10% ethanolic potassium hydroxide solution and the solution is refluxed for 3 hours. The solution is then concentrated to dryness at 40° under 11 torr. Ten milliliters of water are added to the residue which is then extracted with 100 ml. of ether. The ether solution is removed and extracted with 20 ml. of water. The ether solution is then dried with sodium sulfate and concentrated to dryness under 11 torr. The residue is distilled under high vacuum to yield N-phenyl-2,6-dichloroaniline as a yellow oil, at 115°/0.01 torr. The yield is 43% of the theoretical.

Similarly prepared are:

(c) N-(4-chlorophenyl)-2,6-dichloraniline, B.P. 123–125°/0.001 torr.

(d) N-(4-chlorophenyl)-2,6-dichloro-3-methylaniline, B.P. 135–145°/0.005 torr.

(e) N-(4-methoxyphenyl)-2,6-dichloro-3-methylaniline B.P. 115–130°/0.001 torr.

(f) N-(4-methoxyphenyl) - 2,6 - dichloroaniline, M.P. 75–77° from chloroform.

(B) N-chloroacetyl-N-phenyl - 2,6 - dichloro-3-methylaniline: Four grams of N-phenyl-2,6-dichloro-3-methylaniline and 40 ml. of freshly distilled chloroacetyl chloride are refluxed for 1 hour. The dark solution is then concentrated at a bath temperature of 50° under 11 torr. The residue is dissolved in 70 ml. of 1:1 ethyl acetate/ether. This solution is extracted with 10 ml. of 2 N potassium bicarbonate solution and 10 ml. of water, dried over sodium sulfate and concentrated under 11 torr. The product, which is alternatively named as phenyl-2,2'6'-trichloraceto-m-toluidide, is crystallized from cyclohexane, M.P. 117–118°.

Similarly prepared are:

(a) N-chloroacetyl-N-phenyl-2,6-dichloroaniline, M.P. 143–144° from methanol;

(b) N-chloroacetyl-N-phenyl-2-chloro-6-methylaniline, M.P. 110–112° from ether;

(c) N-chloroacetyl-N-(4-chlorophenyl) - 2,6 - dichloroaniline M.P. 130–131° from ethanol/water;

(d) N-chloroacetyl-N-(4-chlorophenyl)-2,6 - dichloro-3-methylaniline, M.P. 106–107° from ethyl ether/petroleum ether;

(e) N-chloroacetyl-N - (4 - methoxyphenyl) - 2,6 - dichloro-3-methylaniline, as a yellow oil; and (f) N - chloroacetyl - N - (4-methoxyphenyl)-2,6-dichloroaniline M.P. 127–128° from methanol.

(C) 1 - (2,6 - dichloro-3-methylphenyl)-2-indolinone: Four grams of N-chloroacetyl-N-phenyl-2,6-dichloro-3-methylaniline and 4 g. of aluminum chloride was well mixed together and heated for 2 hours at 160°. The melt is cooled and poured onto about 50 g. of ice while it is still warm. The oil which separates is dissolved in 50 ml. of chloroform, the chloroform solution is washed with 10 ml. of water, dried over sodium sulfate and concentrated under 11 torr. The residue is distilled. The 1-(2,6-dichloro-3-methylphenyl)-2-indolinone boils at 128–130°/0.001 torr. The oil obtained crystallizes on standing, these crystals melting at 129–132°.

In a similar fashion are obtained:

(a) 1-(2,6-dichlorophenyl)-2-indolinone, M.P. 126–127° from methanol;

(b) 1-(2-chloro-6-methylphenyl)-2 - indolinone, M.P. 96–98° from ether;

(c) 1-(2,6-dichlorophenyl)-5-chloro-2-indolinone, M.P. 130–131° from ethanol/water;

(d) 1 - (2,6 - dichloro-3-methylphenyl)-5-chloro-2-indolinone M.P. 152–154° from ethyl acetate/petroleum ether.

Upon subjecting methoxy substituted derivatives to the procedure of this example, cleavage to the corresponding hydroxy compound can occur. The free hydroxy group can then be alkylated as exemplified by the following procedure:

Ten grams of N-chloroacetyl-N-(methoxyphenyl)-2,6-dichloro-3-methylaniline and 20 g. of finely pulverized aluminum chloride are mixed and the mixture is heated for 1 hour at 280° under an atmosphere of nitrogen. It is cooled and a large quantity of ice and water is added to the melt which has solidified. A black precipitate is formed which is filtered off and dried at 80° under 11 torr. The 1-(2,6-dichloro-3-methylphenyl)-5-hydroxy-2-indolinone, when purified by chromatography on a neutral aluminum oxide column, melts at 184–187°; yield 60% of the theoretical.

In a similar fashion is obtained 1-(2,6-dichlorophenyl)-5-hydroxy-2-indolinone, M.P. 204–205° from methanolbenzene.

A solution of 8.1 g. of this crude 1-(2,6-dichloro-3-methylphenyl)-5-hydroxy-2-indolinone in 26.3 ml. of 1 N sodium hydroxide solution is combined with 3.7 g. of dimethyl sulfate and the whole is refluxed for half an hour. After cooling, the reaction solution is extracted with 400 ml. of ethyl acetate. The organic phase is filtered, the filtrate is washed once with water and once with saturated sodium chloride solution, dried over sodium sulfate and concentrated to dryness under 11 torr. The residue is purified by chromatography on an aluminum oxide column. 1-(2,6-dichloro-3-methylphenyl)-5-methoxy - 2 - indolinone, after recrystallization from ether/petroleum ether, melts at 135–136°; yield 20% of the theoretical.

Similarly prepared is 1-(2,6-dichlorphenyl)-5-methoxy-2-indolinone, M.P. 144–145° from ether/petroleum ether.

These 1-(substituted phenyl)-2-indolinones can be brominated, as exemplified by the following procedure:

A solution of 11.2 g. of 1-(2,6-dichlorophenyl)-2-indolinone in 700 ml. of ethanol is added to a solution of 8 g. of potassium bromide and 2.08 g. of bromine in 160 ml. of water. The mixture is vigorously shaken and then left to stand for 3 hours at 0°. The alcohol is then evaporated off and the insoluble precipitate is filtered off from the remaining aqueous solution. The latter is then taken up in methylene chloride. The methylene chloride solution is dried over sodium sulfate and concentrated to dryness under 11 torr. The residue consists of a mixture, 60% of which is 1-(2,6-dichlorophenyl)-5-bromo-2-indolinone. This is purified by repeatedly chromatographing on a silica gel column and, after having been crystallized several times from ether/petroleum ether, it melts at 188–190°.

(D) 2 - (2,6 - dichloro - 3-methylanilino)phenylacetic acid: A solution of 40 g. of 1-(2,6-dichloro-3-methylphenyl)-2-indolinone in 280 ml. of 1 N sodium hydroxide solution and 420 ml. of ethanol is refluxed for 2 hours. The clear solution is cooled and the ethanol is distilled off at a bath temperature of 40° under 11 torr. The aqueous residue is extracted with 100 ml. of ether and cooled to 5° by the addition of ice (about 50 g.) and external cooling. 2 N hydrochloric acid is then added while stirring until the pH of the solution is about 6. The precipitated acid is taken up in 400 ml. of ether, the ether solution is separated and the aqueous solution is again extracted with 200 ml. of ether. The ether solutions are washed with 50 ml. of water, combined, dried over sodium sulfate and concentrated under 11 torr without heating. After adding petroleum ether to the concentrated ethereal solution, 2 - (2,6-dichloro-3-methylanilino)-phenylacetic acid crystallizes out. After recrystallization from ether/petroleum ether, it melts at 146–149°.

In a similar manner there are obtained:

(a) 2 - (2,6 - dichloroanilino)phenylacetic acid, M.P. 156–158°;

(b) 2-(2 - chloro-6 - methylanilino)phenylacetic acid, M.P. 140–147° from ether;

(c) 2-(2,6-dichloroanilino)-5-chlorophenylacetic acid, M.P. 181–183° from methanol;

(d) 2 - (2,6 - dichloro - 3 - methylanilino)-5-chlorophenylacetic acid, M.P. 152–156° from ethyl ether/petroleum ether;

(e) 2 - (2,6 - dichloro - 3-methylanilino)-5-methoxyphenylacetic acid, M.P. 120–122° from ethyl ether/petroleum ether;

(f) 2 - (2,6 - dichloroanilino)-5-methoxyphenylacetic acid, M.P. 134–136° from ethyl ether/petroleum ether;

(g) 2 - (2,6 - dichloroanilino) - 5 - bromophenylacetic acid, M.P. 161° from ether.

EXAMPLE 2

2-(3-trifluoromethylanilino)phenylacetic acid (A) 2 -(3 - trifluoromethylanilino)benzyl alcohol: To a solution of 3.8 g. of sodium borohydride in 160 ml. of anhydrous diglyme are added 8.7 g. of lithium bromide. The mixture is stirred for half an hour at room temperature. A solution of 14.8 g. of methyl 2-(3-trifluoromethylanilino)benzoate [alternatively named as N-($\alpha,\alpha,\alpha$-trifluoro-m-tolyl)anthranilic acid methyl ester] in 40 ml. of anhydrous diglyme is added dropwise. The whole is then heated for 3 hours at 100°, cooled and poured onto a mixture of 300 g. of ice and 30 ml. of concentrated hydrochloric acid. After stirring for a short time, the oil which separates is extracted with 300 ml. of ethyl acetate. The ethyl acetate solution is washed with 2 N potassium bicarbonate solution and water, dried over sodium sulphate and concentrated at 40° under 11 torr. The residue is distilled on a short Vigreux column to yield 2-(3-trifluoromethylanilino)benzyl alcohol [alternatively named as o-($\alpha,\alpha,\alpha$-trifluoro-m-toluidino)benzyl alcohol] which boils at 127-129°/0.001 torr. The yield is 75% of the theoretical.

Alternatively, 9.97 g. of lithium aluminum hydride are suspended in 100 ml. of absolute ether and the suspension is cooled to 5° with stirring. A solution of 36.8 g. of methyl 2-(3-trifluoromethylanilino)benzoate in 140 ml. of absolute ether is slowly added dropwise, the addition being made under an atmosphere of nitrogen with external cooling. The mixture is then stirred for 18 hours at room temperature. Ten milliliters of water, 10 ml. of 15% sodium hydroxide solution and another 30 ml. of water are added dropwise to the stirred mixture which has been cooled to 0°. The whole is stirred for 1 hour at room temperature and then filtered. The filtrate is concentrated at 40° under 11 torr. The residue is fractionated by means of a short Vigreux colmn to yield 2-(v-trifluoromethylanilino)benzyl alcohol.

In a similar fashion are obtained:

(a) 2-(2,3-dimethylanilino)benzyl alcohol, B.P. 136–141°/0.005 torr;

(b) 2 - (2 - methoxy-5-methylanilino)benzyl alcohol, M.P. 138–139° from methanol;

(c) 2 - (2 - chloro - 5 - trifluoromethylanilino)benzyl alcohol, M.P. 100–101° from petroleum ether;

(d) 2-(2,6-dichloroanilino)-5-methoxybenzyl alcohol, M.P. 112–113° from cyclohexane.

Sodium borohydride can also be used in the foregoing reduction.

As a third alternative method, the free benzoic acid can be reduced with lithium aluminum hydride. Thus a suspension of 65 g. of 2-(2,6-dichloroanilino)benzoic acid in 500 ml. of absolute tetrahydrofuran is added dropwise at 5–15° to 30 g. of lithium aluminum hydride in 150 ml. of absolute tetrahydrofuran. The reaction mixture is stirred for 15 hours under reflux whereupon, at 0–5°, 30 ml. of water, 30 ml. of 15% sodium hydroxide solution and 90 ml. of water are carefully added dropwise. After adding 200 ml. of tetrahydrofuran, the organic solution is removed from the crystalline precipitate by filtration under suction and the latter is well washed with tetrahydrofuran.

The combined solutions are concentrated, taken up in ethyl acetate and washed with 2 N sodium carbonate solution and saturated sodium chloride solution. Concentration of the organic phase yields 44.4 g. of an oil which is crystallized from ethyl ether/petroleum ether to yield 2-(2,6-dichloroanilino)benzyl alcohol [compound (e)], M.P. 110–112°.

In a similar fashion is obtained:

(f) 2-(2-methyl-3-chloroanilino)benzyl alcohol, M.P. 51–52° from ethyl ether/petroleum ether.

(B) N-acetyl-2-(3-trifluoromethylanilino)benzyl chloride: A solution of 23 g. of 2-(3-trifluoromethylanilino)-benzyl alcohol in 70 ml. of acetyl chloride is refluxed for 1 hour under an atmosphere of nitrogen. The orange colored solution is then concentrated at a bath temperature of 40° under 11 torr. The residue is dissolved in 150 ml. of ethyl acetate/ether 1:1. The organic phase is washed with 20 ml. of 2 N potassium bicarbonate solution and 20 ml. of water, dried over sodium sulfate and concentrated in vacuo. A pale oil remains which is crystallised from ether/petroleum ether. The product [which is alternatively named as $\alpha$-chloro-N-$\alpha,\alpha,\alpha$-trifluoro-m-tolyl)-aceto-o-toluidide] melts at 83–85°.

Similarly obtained is N-acetyl-2-(2-methoxy-5-methylanilino)benzyl chloride, M.P. 121–123° from petroleum ether.

(C) N - acetyl-2-(3-trifluoromethylanilino)phenylacetonitrile: A solution of 11.6 g. of N-acetyl-2-(3-trifluoromethylanilino)benzyl chloride in 60 ml. of dimethyl sulfoxide is added within 10 minutes to a suspension of 2.2 g. of sodium cyanide in 20 ml. of dimethyl sulfoxide, the addition being made at 40° while stirring. The temperature should not exceed 40° during the addition. The mixture is stirred for 3 hours at 40°, cooled to 10° and diluted with 200 ml. of water. The solution is extracted four times with 150 ml. of ethyl acetate. The ethyl acetate solutions are then shaken with 200 ml. of 6 N hydrochloric acid and then with 30 ml. of water, dried over sodium sulfate and concentrated at 40° under 11 torr. The product [alternatively named as $\alpha$-cyano-N-($\alpha,\alpha,\alpha$-trifluoro-m-tolyl)-aceto-o-toluidide] remains as a yellow oil which can be used directly.

Similarly obtained is N-acetyl-2-(2-methoxy-5-methylanilino)phenylacetronitrile, M.P. 108–109° from cyclohexane.

(D) 2 - (3-trifluoromethylanilino)phenylacetic acid: Nine and one-half grams of N-acetyl-2-(3-trifluoromethylanilino)phenylacetonitrile are dissolved in 100 ml. of ethanol and 90 ml. of 1 N sodium hydroxide solution. The solution is refluxed overnight. It is cooled and concentrated to about 70 ml. at 40° under 11 torr. The aqueous alkaline solution is extracted with 50 ml. of ether, this ether solution is separated and the aqueous phase is acidified with 2 N hydrochloric acid. The acid solution is extracted with 50 ml. of ether, the ether extract is washed with water, the ether solution is dried over sodium sulfate and concentrated under 11 torr without heating. The residue is crystallized from ether/petroleum ether. After recrystallization from ether/petroleum ether, 2 - (3 - trifluoromethylanilino)phenylacetic acid [alternatively named as o-($\alpha,\alpha,\alpha$-trifluoro-m-toluidino)penylacetic acid melts at 112–114°. The yield is 35% of theoretical.

Alternatively, this product can be prepared by the following procedure:

A solution of 50 g. of N-acetyl-2-(3-trifluoromethylanilino)phenylacetonitrile in 550 ml. of absolute ether and 375 ml. of absolute ethanol is cooled to 0–5° while stirring and excluding moisture. Dry hydrogen chloride is introduced into the solution for 4 hours, during which the temperature should not exceed 5°. Hydrogen chloride is then introduced for another 5 hours at room temperature. The solution is then left to stand overnight at room temperature after which it is evaporated to dryness at a bath temperature of 40° under 11 torr. The residue is dissolved in 140 ml. of water, the solution is covered with 150 ml. of ether and the whole is refluxed for 2 hours on a steam bath. It is then cooled, the ether phase is removed and the aqueous solution is again extracted with 200 ml. of ether. The combined ether solutions are dried over sodium sulfate and evaporated at 40° under water jet vacuum. The residue is fractionated by means of a Vigreux column under high vacuum. Ethyl N-acetyl-2-(3-trifluoromethylanilino)phenylacetate boils at 110–115°/0.001 torr.

Similarly obtained is ethyl N-acetyl-2-(2-methoxy-5-methylanilino)phenylacetate, B.P. 130–135°/0.001 torr.

A solution of 16.4 g. of ethyl N-acetyl-2-(3-trifluoromethylanilino)phenylacetate in 225 ml. of 95% ethanol and 67 ml. of 2 N sodium hydroxide solution is refluxed for 16 hours. The ethanol is then distilled off at 40° under 11 torr and the aqueous solution which remains is extracted with 40 ml. of ether. The ethereal phase is separated, the aqueous phase is cooled to 0–5° by the addition of ice and acidified to pH 6 with 2 N hydrochloric acid. The oil which separates out is dissolved in 200 ml. of ether, the ethereal solution is washed with 20 ml. of water and dried over sodium sulfate. It is then concentrated under 11 torr without warming. On adding petroleum ether, 2-(3-trifluoromethylanilino)phenylacetic acid crystallizes, M.P. 112–114°.

Similarly prepared is 2-(2-methoxy-5-methylanilino)phenylacetic acid, M.P. 98–99° from ether.

EXAMPLE 3

2-(2-chloro-5-trifluoromethylanilino)phenylacetic acid (A) 2 - (2-chloro-5-trifluoromethylanilino)benzyl chloride: A solution of 20 g. of 2-(2-chloro-5-trifluoromethylanilino)benzyl alcohol [prepared as in Example 2A (c)] in 70 ml. of acetyl chloride is refluxed for 16 hours under an atmosphere of nitrogen. The solution is then concentrated at about 40° under reduced pressure. The residue is taken up in 40 ml. of benzene and again concentrated. The residue is then taken up in 200 ml. of ether, the ethereal solution is washed with 2 N sodium carbonate solution and water, dried over sodium sulfate and the solvent is evaporated off under reduced pressure. The oil which remains is distilled under high vacuum, B.P. 120°/0.001 torr. The 2 - (2 - chloro - 5-trifluoromethylanilino)benzyl chloride can be crystallized from petroleum ether, M.P. 50–51°. The yield is 32% of theoretical.

Alternatively, 150 ml. of 5 N absolute ethereal hydrogen chloride are added dropwise to a stirred solution of 5 g. of 2-(2,3-dimethylanilino)-benzyl alcohol in 150 ml. of absolute ether. Crystals precipitate and are dissolved by addition of 400 ml. of absolute ether. The solution is stirred for 30 minutes at room temperature and is evaporated at 40° and 11 mm. Hg. The residue is triturated with ether whereupon it crystallizes. The crystals are filtered and treated with a mixture of 20 ml. of water and 100 ml. of ether. The ether phase is separated, extracted with water, dried over sodium sulfate and evaporated under reduced pressure to yield 2-(2,3-dimethylanilino)benzyl chloride. 2-(2-methyl-3-chloroanilino)benzyl chloride is obtained in an analogous fashion.

Similarly from the benzyl alcohol prepared in Example 2A (d), there is obtained:

(d) 2-(2,6-dichloroanilino)-5-methoxybenzyl chloride, M.P. 82–84° from petroleum ether.

Alternatively, a solution of 37.5 g. of 2-(2,6-dichloroanilino)benzyl alcohol in 560 ml. of absolute ether and 56 ml. of absolute pyridine is quickly added dropwise at 0–5° to a solution of 56 ml. of thionyl chloride and 56 ml. of pentane. The mixture is stirred for 30 minutes at 0°. Ice is added and the mixture successively extracted with 100 ml. of 2 N hydrochloric acid, 100 ml. of 2 N sodium hydroxide solution and 100 ml. of water. The organic phase is then filtered to remove insoluble constituents. The filtrate is dried over potassium carbonate and evaporated to dryness under 11 torr.

2-(2,6-dichloroanilino)benzyl chloride remains as a yellow oil and can be used without further purification.

(B) 2 - (2 - chloro - 5 - trifluoromethylanilino)phenylacetonitrile: A suspension of 6 g. of sodium cyanide in 120 ml. of dimethyl sulfoxide is heated to 40°. Then a solution of 33 g. of 2-(2-chloro-5-trifluoromethylanilino)benzyl chloride in 150 ml. of dimethyl sulfoxide is added while stirring, during which addition the temperature should not rise above 40°. The mixture is stirred for 3 hours at 40° and then diluted with 600 ml. of water. The solution is then extracted three times with 1000 ml. of ethyl acetate each time. The combined extracts are washed with 100 ml. of 6 N hydrochloric acid and with 100 ml. of water, dried over sodium sulfate and the solvent is distilled off under reduced pressure. The residue is distilled under high vacuum. The 2-(2-chloro-5-trifluoromethylanilino)phenylacetonitrile boils at 122–126°/0.01 torr. and can be crystallized from petroleum ether. After recrystallization it melts at 58–59°. The yield is 74% of theoretical.

Similarly obtained are:

(d) 2 - (2,6 - dichloroanilino) - 5-methoxyphenylacetonitrile, M.P. 169–171°;

(e) 2-(2,6-dichloroanilino)phenylacetonitrile, M.P. 71–72° from ethyl ether/petroleum ether.

Similarly from 2 - (2 - methyl - 3-chloroanilino)benzyl chloride and 2-(2,3-dimethylanilino)benzyl chloride there are obtained:

(f) 2 - (2 - methyl - 3-chloroanilino)phenylacetonitrile, M.P. 86–88°;

(g) 2 - (2,3 - dimethylanilino)phenylacetonitrile, M.P. 95–96°

(C) 2 - ( 2 -chloro - 5 - trifluoromethylanilino)phenylacetic acid: A solution of 18.4 g. of 2-(2-chloro-5-trifluoromethylanilino)phenylacetonitrile in 120 ml. of 1 N sodium hydroxide solution and 120 ml. of ethanol is refluxed for 10 hours. The volume of the reaction solution is then reduced at 40° under reduced pressure to about 80 ml. and the aqueous solution is extracted with 100 ml. of ether. The aqueous-alkaline phase is then acidified at 5° with 2 N hydrochloric acid and the oil which separates is taken up in ether. The ether solution is removed, washed with water, dried over sodium sulfate and, without heating, is concentrated under reduced pressure. On adding petroleum ether, the product [which may be alternatively named as o-(3-trifluoromethyl-6-chloroanilino)phenylacetic acid] crystallizes out, M.P. 94–96°; yield 55% of theoretical.

Alternatively, a solution of 2 g. of 2-(2,3-dimethylanilino)phenylacetonitrile and 3 g. potassium hydroxide in 60 ml. butanol is refluxed for 3 hours. The solution is then concentrated at 60° under 0.1 torr. The residue is taken up in 100 ml. of water and the aqueous solution is washed with ether and acidified with 2 N hydrochloric acid. The oil which precipitates is extracted with ether. The ethereal solution is washed to neutrality with water, dried over magnesium sulfate and evaporated under 11 torr. The residue is crystallized from ethyl ether/petroleum ether to yield 2-(2,3-dimethylanilino)phenylacetic acid, M.P. 112–113°.

Similarly prepared are:

(d) 2-(2,6-dichloroanilino) - 5 - methoxyphenylacetic acid, M.P. 134–136° from ethyl ether/petroleum ether;

(e) 2 - (2,6 - dichloroanilino)phenylacetic acid, M.P. 156–158° from ethyl ether/petroleum ether;

f) 2-(2-methyl-3-chloroanilino)phenylacetic acid, M.P. 124–125°.

EXAMPLE 4

2-[2-(2,6-dichloro-3-methylanilino)
phenyl]propionic acid (A) N-(2 - chloropropionyl)-N-phenyl-2,6-dichloro-3-methylaniline: A solution of 5 g. of N-phenyl-2,6-dichloro-3-methylaniline in 20 ml. of α-chloropropionyl chloride is refluxed for 1 hour while introducing nitrogen. It is then evaporated to dryness in vacuo at 40° and the residue is dissolved in 1:1 ethyl acetate/chloroform. The solution is extracted with 2 N potassium bicarbonate solution and water, dried over sodium sulfate and concentrated at 40° under 11 torr. The residue is distilled in a bulb tube to yield the intermediate, B.P. 155–160°/0.001 torr. M.P. after recrystallization from ethyl ether/petroleum ether, 105–107°. The yield is 59°.

Similarly prepared are:

(a) N-(2-chloropropionyl) - N - phenyl-2,6-dichloroaniline, M.P. 123–125° from methanol;

(b) N-(2-chloropropionyl)-N-(4 - chlorophenyl)-2,6-dichloroaniline, M.P. 106–108° from methanol.

(B) 1-(2,6-dichloro-3-methylphenyl) - 3 - methyl-2-indolinone: A mixture of 31.2 g. of N-(2-chloropropionyl)-

N-phenyl-2,6-dichloro-3-methylaniline and 31.2 g. of aluminum chloride is heated for 2 hours at 160°. The melt is cooled and poured onto 500 g. of ice. The oil which separates is dissolved in 100 ml. of ether. The ether solution is washed with 50 ml. of 2 N potassium bicarbonate solution and with 100 ml. of water, dried over sodium sulfate and concentrated in vacuo at 40°. The residue is chromatographed on 500 g. of neutral aluminum oxide.

The fractions 3–7, eluted with benzene, contain 1-(2,6-dichloro-3-methylphenyl)-3-methyl-2-indolinone. They are combined and crystallized from ether, M.P. 110–130°. The yield is 44% of theoretical.

Similarly prepared is:

(a) 1-(2,6-dichlorophenyl) - 3 - methyl-2-indolinone, M.P. 98–99°; and (b) 1-(2,6 - dichlorophenyl)-3-methyl-5-chloro-2-indolinone, M.P. 146–149° from ethyl ether/petroleum ether.

3-alkyl-2-indolinones can also be prepared according to the following procedure:

A solution of 5.6 g. of 1-(2,6-dichlorophenyl)-2-indolinone in 10 ml. of absolute dimethylformamide is added to a suspension of 1 g. of sodium hydride in mineral oil, suspended in 30 ml. of absolute dimethylformamide, the addition being made dropwise at 0–5°. The mixture is then stirred for 40 minutes at 10° after which 3.2 g. of ethyl iodide are added dropwise. The mixtrue is then stirred for 15 hours at room temperature. It is poured onto ice and extracted with 200 ml. of ether. The ether solution is separated, washed with water, dried over sodium sulfate and evaporated to dryness under 11 torr. The residue is chromatographed on 200 g. of neutral aluminum oxide. The fractions 2–3, eluted with 1:1 ethyl ether/petroleum ether, contain the pure 1-(2,6-dichlorophenyl)-3-ethyl-2-indolinone. After crystallizing twice from methanol, the compound melts at 100–101°. The yield is 15% of theoretical.

3-benzyl-2-indolinones can be prepared according to the following two step procedure. Thus 2.78 g. of 1-(2,6-dichlorophenyl)-2-indolinone are dissolved in 50 ml. of absolute ethanol, 1.06 g. of benzaldehyde and 2 drops of piperidine are then added. The whole is heated for 5 hours at 50°. The reaction mixture is then concentrated in vacuo and the residue is purified by chromatography on an aluminum oxide column. Crystallized from ether, 1-(2,6-dichlorophenyl)-3-benzal-2-indolinone melts at 135–136°. The yield is 80% of theoretical.

Three grams of 1-(2,6-dichlorophenyl)-3-benzal-2-indolinone are dissolved in 100 ml. of dioxan and 0.2 g. of 5% platinum charcoal are then added. The mixture is hydrogenated at room temperature under normal pressure to yield 1-(2,6-dichlorophenyl)-3-benzyl-2-indolinone as a yellow oil in 60% yield.

(C) 2-[2-(2,6 - dichloro-3-methylanilino)phenyl]propionic acid: A solution of 3.1 g. of 1-(2,6-dichloro-3-methylphenyl-3-methyl-2-indolinone in 35 ml. of ethanol and 20 ml. of 1 N sodium hydroxide solution is refluxed for 1 hour. The solution is then concentrated at 50° under 11 torr, the residue is dissolved in 200 ml. of water and the aqueous solution is extracted with 50 ml. of ether. The aqueous solution is separated and rendered acidic at 5° with 2 N hydrochloric acid. The oil which separates is dissolved in 100 ml. of ether, the ether solution is washed with a little water, dried over sodium sulfate and concentrated under 11 torr. The residue is crystallized from ether/petroleum ether. After recrystallization from ether/petroleum ether, the product [alternatively named as o-(2,6-dichloro-m-toluidino)-hydratropic acid] melts at 143–145°. The yield is 30% of theoretical.

Similarly obtained are:

(a) 2 - [2 - (2,6 - dichloroanilino)phenyl]propionic acid, M.P. 154–156° from the ethyl ether/petroleum ether;

(b) 2 - [2 - (2,6 - dichloroanilino)-5-chlorophenyl]propionic acid, M.P. 169–171° from ethyl ether/petroleum ether;

(c) 2 - [2 - (2,6 - dichloroanilino)phenyl]butyric acid, M.P. 164–165° from ethyl ether/petroleum ether;

(d) 2 - [2 - (2,6 - dichloranilino)phenyl]-3-phenylpropionic acid, M.P. 132–133° from ethyl ether/petroleum ether.

EXAMPLE 5

2-[2-(2,6-dichloroanilino)-phenyl]-2-methylpropionic acid (A) 1 - (2,6 - dichlorophenyl)3,3 - dimethyl-2-indolinone: A solution of 5.6 g. of 1-(2,6-dichlorophenyl)-2-indolinone, M.P. 126–127°, in 10 ml. of absolute dimethylformamide is added to a suspension of 2.1 g. of sodium hydride-mineral oil (1:1) in 30 ml. of absolute dimethylformamide, the addition being made dropwise at 0–5° under an atmosphere of nitrogen. The whole is stirred for 40 minutes at 10° whereupon 7 g. of methyl iodide are added dropwise. The mixture is then stirred for 15 hours at room temperature after which it is poured onto crushed ice. It is extracted with 200 ml. of ether 5 times. The ether extracts are combined and washed with 100 ml. of water, dried over sodium sulfate and concentrated under 11 torr. The residue is crystallized from ether. 1-(2,6-dichlorophenyl)-3,3-dimethyl-2-indolinone melts at 128–130°. The yield is 67% of theoretical.

(B) 2 - [2 - (2,6 - dichloroanilino)phenyl]-2-methylpropionic acid: A solution of 1.5 g. of 1-(2,6-dichlorophenyl)-3,3-dimethyl-2-indolinone in 15 ml. of ethanol and 10 ml. of 2 N sodium hydroxide solution is refluxed for 48 hours. It is then cooled to room temperature and 50 ml. of water are added. The crystals which precipitate are filtered off. The filtrate is extracted with 30 ml. of ether. The ether solution is separated and the aqueous phase is acidified with 2 N hydrochloric acid. The precipitated crystals are dissolved in chloroform/ether 1:1, the organic phase is washed with water, dried over sodium sulfate and concentrated at 40° under 11 torr. The residue crystallizes from ether to yield the product [which is alternatively named o-2,6-dichloroaniino)-α-methyl-hydratropic acid] which melts, after recrystallization from ether, at 187–192°. The yield is 20% of theoretical.

EXAMPLE 6

2-(2,6-dichloranilino)phenylacetic acid, sodium salt

A solution of 186 g. of 1-(2,6-dichlorophenyl)-2-indolinone in 660 ml. of ethanol and 660 ml. of 2 N sodium hydroxide solution is refluxed for 4 hours. The solution is then cooled and left to stand for 4 hours at 0–5°. The crystals which form are filtered off and recrystallized from water. The sodium salt of 2-(2,6-dichloranilino)-phenylacetic acid melts at 283–285°. The yield is 97% of theoretical.

Similarly obtained are:

The sodium salt of 2-(2,6-dichloroanilino)-5-chlorophenylacetic acid, M.P. 296° upon recrystallization from water;

The sodium salt of 2-(2,6-dichloro-3-methylanilino)-phenylacetic acid, M.P. 287–289° from water;

The sodium salt of 2-[2-(2,6-dichloroanilino)-5-chlorophenyl]propionic acid, M.P. 255–257° from water;

The sodium salt of 2-(2-chloro-5-trifluoromethylanilino)-phenylacetic acid, M.P. 225–230° from water.

EXAMPLE 7

2-(2,6-dichloroanilino)phenylacetic acid, potassium salt

Twenty milliliters of 8% ethanolic potassium hydroxide solution are added to a solution of 8.9 g. of 2-(2,6-dichloroanilino)phenylacetic acid in 50 ml. of ethanol. The solution is boiled for 10 minutes with activated charcoal, filtered and concentrated under 11 torr. Upon adding ether, the potassium salt of 2-(2,6-dichloroanilino)phenylacetic acid crystallizes out, M.P. 300–330° with decomposition.

EXAMPLE 8

Methyl 2-(2,6-dichloro-3-methylanilino)phenylacetate

One hundred milliliters of 2% ethereal diazomethane solution are slowly added dropwise to a solution of 10 g. of 2 - (2,6 - dichloro-3-methylanilino)phenylacetic acid (M.P. 146–149°) in 150 ml. of absolute ether. The solution is allowed to stand overnight at room temperature and then evaporated to dryness at 40° under 11 torr. The residue is dissolved in 100 ml. of ether. The ether solution is extracted with 50 ml. of 1 N potassium bicarbonate solution and with water, dried over sodium sulfate and concentrated at 40° under 11 torr. The residue crystallizes from ether/petroleum ether. The product [alternatively named as o-(2,4-dichloro-m-toluidino)-phenylacetic acid methyl ester] melts at 110–112°. The yield is 70% of theoretical.

In a similar fashion there are obtained from the corresponding acids the following compounds:

(a) Methyl 2 - (2,6 - dichloroanilino)phenylacetate, M.P. 101–102° from ethyl ether/petroleum ether;

(b) Methyl 2 - (2,6 - dichloroanilino)-5-chlorophenylacetate, M.P. 87–88° from ethyl ether/petroleum ether;

(c) Methyl 2 - (2,6 - dichloro - 3 - methylanilino) - 5 - methoxyphenylacetate, purified by distillation under high vacuum and recrystallization from ethyl ether/petroleum ether;

(d) Methyl 2 - (3 - trifluoromethylanilino)phenylacetate, purified by distillation, B.P. 120°/0.01 torr;

(e) Methyl 2 - (2 - methoxy - 5-methylanilino)phenylacetate;

(f) Methyl 2 - (2 - chloro - 5 - trifluoromethylanilino)phenylacetate;

(g) Methyl 2 - [2 - (2,6 - dichloroanilino)phenyl]propionate, M.P. 83–85° from ethyl ether/petroleum ether;

(h) Methyl 2 - [2 - (2,6 - dichloro-3-methylanilino)phenyl]propionate, M.P. 110–112° from ethyl ether/petroleum ether;

(i) Methyl 2-[2-(2,6-dichloroanilino)phenyl]butyrate;

(j) Methyl 2-(2-methyl-3-chloroanilino)phenylacetate, M.P. 47–48°;

(k) Methyl 2 - (2,3 - dimethylanilino)phenylacetate, M.P. 52–54°.

EXAMPLE 9

Ethyl 2-(2,6-dichloroanilino)phenylacetate

A solution of 16 g. of 2-(2,6-dichloroanilino)phenylacetic acid in 1600 ml. of water and 40 ml. of 2 N sodium hydroxide solution is cooled to 5°. Ten milliliters of diethyl sulfate are added while stirring, the solution being cooled with an ice bath. Stirring is continued for 2 hours at 5–10°, and then another 20 ml. of 2 N sodium hydroxide solution and 10 ml. of diethyl sulfate are added. The reaction mixture is then stirred for 15 hours at room temperature. The precipitated crystals are filtered off, well washed with water and dissolved in 100 ml. of ether. The ethereal solution is extracted with 30 ml. of water, dried over sodium sulfate and concentrated at 40° under reduced pressure. Ethyl 2-(2,6-dichloroanilino)-phenylacetate crystallizes from ether/petroleum ether, M.P. 50–52°. The yield is 15% of theoretical.

In a similar fashion, there is obtained ethyl 2-(2,6-dimethylanilino)phenylacetate, M.P. 56–57° from ethyl ether/petroleum ether.

Alternatively, a solution of 5.48 g. of 2-(2-chloro-6-methylanilino)phenylacetic acid in 20 ml. of 1 N sodium hydroxide solution is concentrated to dryness under 11 torr at 50°. The residue is treated with 50 ml. of anhydrous benzene and again concentrated to dryness under 11 torr. The residue is dissolved in 60 ml. of anhydrous dimethyl formamide and this solution is treated with 3.22 g. of dimethyl sulfate at 0–10° with stirring. The solution is stirred for one hour at room temperature and then one hour at 50°. The solution is next concentrated to dryness under 0.1 torr at 50° and the residue, a yellow oil, is dissolved in 100 ml. of ether. The ether solution is washed with 20 ml. of water and 20 ml. of saturated sodium chloride solution, dried over sodium sulfate and concentrated to dryness under 11 torr at 40°. The residue is crystallized from cyclohexane to yield methyl 2-(2-chloro-6-methylanilino)phenylacetate, M.P. 99–100°.

In a similar fashion is obtained methyl 2-(2,6-dimethylanilino)phenylacetate, M.P. 79–81° from ethyl ether/petroleum ether.

EXAMPLE 10

Benzyl 2-(2,6-dichloroanilino)phenylacetate

A solution of 2.96 g. of (2,6-dichloroanilino)phenylacetic acid, 1.2 g. of absolute benzyl alcohol and 3 g. of the dineophentyl acetal of dimethylformamide in 40 ml. of methylene chloride is stirred for 55 hours under an atmosphere of nitrogen. The methylene chloride is removed by distillation and the residue is diluted with 50 ml. of ethyl acetate, extracted with water, dried over sodium sulfate, and concentrated to dryness at 40° under 11 torr. The residue is chromatographed on 60 g. of neutral aluminum oxide. Fractions 2 and 3, eluted with ether/petroleum 7:3, contain the pure 2-(2,6-dichloroanilino)phenylacetic acid benzyl ester, M.P. 132–133°. The yield is 30% of theoretical.

Alternatively, 6 ml. of thionyl chloride are added dropwise to 40 ml. of absolute benzyl alcohol, the addition being made at −10° while stirring well and introducing nitrogen. After 5 minutes, at −10°, a solution of 2.96 g. of 2-(2,6-dichloroanilino)phenylacetic acid in 10 ml. of absolute benzyl alcohol is added dropwise. The reaction mixture is then stirred for 15 hours at room temperature and poured onto ice. The oil which separates is extracted with 100 ml. of ether. The ether extract is washed with 10 ml. of 2 N potassium bicarbonate solution and water, dried over sodium sulfate and the ether solution is concentrated to dryness at 40° under 11 torr. The residue is chromatographed on 90 g. of neutral aluminum oxide. Fractions 1 and 2, eluted with 1:1 ether/petroleum ether, contain the pure 2-(2,6-dichloroanilino)phenylacetic acid benzyl ester, M.P. 132–133°. The yield is 48% of the theoretical.

EXAMPLE 11

2-(2,6-dimethylanilino)phenylacetic acid (A) 2-(2,6-dimethylanilino)benzoic acid: A mixture consisting of 525 g. of o-chlorobenzoic acid and 195 g. of 85% potassium hydroxide in 1500 ml. of n-pentanol is heated, while stirring to 160°. About 400 ml. of n-pentanol are distilled off within 30 minutes. One kilogram of 2,6-xylidine and 12.5 g. of copper powder are then added and the mixture is refluxed for 15 hours. The mixture is then cooled and poured into a solution of 180 g. of sodium carbonate in 600 ml. of water and the solution distilled with steam. After the excess 2,6-xylidine has been distilled off, the aqueous residue is filtered over Hyflo and the filtrate acidified with concentrated hydrochloric acid. The precipitated crystals are filtered off and recrystallized from ethanol-water to yield 460 g. of 2-(2,6-dimethylanilino)-benzoic acid, M.P. 205–208°. The yield is 57%.

The following are similarly obtained:

(a) 2-(2-chloro-3-trifluoromethylanilino)benzoic acid, M.P. 183–185°;

(b) 2-(2-chloro-6-methylanilino)benzoic acid, M.P. 216–217°;

(c) 2-(2,6-dichloroanilino)benzoic acid, M.P. 212–213°;

(d) 2-(2,6-dichloro - 3 - methylanilino)benzoic acid, M.P. 247–249°;

(e) 2-(2-methoxy-5-methylanilino)benzoic acid, M.P. 141–142°;

(f) 2-(2,6-dimethylanilino) - 5 - methylbenzoic acid, M.P. 220–225°.

(B) N-phenyl-2,6-dimethylaniline: Three hundred and seventy grams of 2-(2,6-dimethylanilino)benzoic acid are heated for 2½ hours to 280°. The cooled melt is dissolved in 1500 ml. of ether. The ether solution is washed twice with 300 ml. of 2 N sodium carbonate solution and 300 ml. of water. The ether solution is separated, then dried over sodium sulfate and concentrated to dryness under 11 torr at 40°. The residue is distilled, whereby the N-phenyl-2,6-xylidine is obtained as a yellow oil, B.P. 125°/0.01 torr. The distillate is crystallized from petroleum ether to yield 230 g. of the product [alternatively named as N-phenyl-2,6-xylidine], M.P. 52–54°.

Similarly obtained are:

(a) N-phenyl-2-chloro-5-trifluoromethylaniline, B.P. 85–88°/0.001 torr;

(b) N-phenyl-2-chloro - 6 - methylaniline, B.P. 88°/0.05 torr;

(c) N-phenyl - 2,6 - dichloroaniline, B.P. 109–111°/0.003 torr;

(d) N-phenyl-2,6-methylaniline, B.P. 115–120°/0.001 torr;

(e) N-phenyl-2-methoxy-5-methylaniline, B.P. 122°/0.001 torr;

(f) N-(4-methylphenyl) - 2,6 - dimethylaniline, B.P. 115–120°/0.001 torr.

(C) N-phenyl - 2,6 - dimethyloxaniloyl chloride: One hundred sixty two milliliters of oxalyl chloride are slowly added dropwise at 5° to a solution of 101 g. of N-phenyl-2,6-dimethylaniline in 650 ml. of anhydrous benzene. The suspension is then stirred for 2 hours at room temperature and for ½ hour at 50°, whereby the suspension goes into solution. The reaction solution is cooled and evaporated to dryness under 11 torr with a bath temperature of 40°. The residue is dissolved in 400 ml. of anhydrous benzene and the solution again evaporated to dryness under 11 torr. The residue is crystallized from benzene/petroleum ether. N-phenyl-2,6-dimethyloxaniloyl chloride melts at 78–80°. The yield is 87% of theoretical value.

The following are analogously produced:

(a) N-phenyl-2-chloro-5-trifluoromethyloxaniloyl chloride (oil);

(b) N-phenyl - 2 - chloro-6-methyloxaniloyl chloride (oil);

(c) N-phenyl-2,6-dichlorooxaniloyl chloride, M.P. 107–109° (from ether/petroleum ether);

(d) N-phenyl-2,6-dichloro-3-methyloxaniloyl chloride, M.P. 103–105° (from ether/petroleum ether);

(e) N - phenyl-2-methoxy-5-methyloxaniloyl chloride (oil);

(f) N-(4-methylphenyl)-2,6-dimethyloxaniloyl chloride (oil).

(D) 1-(2,6-dimethylphenyl)indol-2,3-dione: To a solution of 124 g. of N-phenyl-2,6-dimethyloxaniloyl chloride in 900 ml. of tetrachloroethane are added in portions 58.6 g. of pulverized aluminum chloride. The mixture is stirred for 48 hours at room temperature. It is then poured on to a mixture of 1000 g. of ice and 200 ml. of 2 N hydrochloric acid. Five hundred milliliters of chloroform are added and the mixture is well shaken. The tetrachloroethane/chloroform solution is separated and washed first with 300 ml. of 2 N sodium carbonate solution and subsequently with 300 ml. of water. It is dried over sodium sulfate and concentrated to dryness under 0.1 torr. The residue is crystallized from ether/petroleum ether to yield the product [alternatively named as 1-(2,6-xylyl)-indol-2,3-dione] which melts at 157–159°. The yield is 95% of theoretical value.

Similarly obtained are:

(a) 1-(2-chloro - 5 - trifluoromethylphenyl)indol-2,3-dione, M.P. 134–136° (from ethyl ether);

(b) 1-(2 - chloro - 6 - methylphenyl)indol-2,3-dione, M.P. 163–165° (from ethyl ether);

(c) 1-(2,6-dichlorophenyl)indol-2,3-dione, M.P. 175–176° (from ethanol);

(d) 1-(2,6-dichloro - 3 - methylphenyl)indol-2,3-dione, M.P. 162–165° (from ethanol);

(e) 1-(2-methoxy - 5 - methylphenyl)indol-2,3-dione, M.P. 168–169° (from ethyl acetate);

(f) 1-(2,6-dimethylphenyl) - 5 - methylindol-2,3-dione, M.P. 158° (from ethyl ether).

(E) 2-(2,6-dimethylanilino)phenylacetic acid: To a solution of 3 g. of 1-(2,6-xylyl)-indol-2,3-dione in 20 ml. of diethylene glycol monomethyl ether are added 1.56 g. of hydrazine hydrate. After 15 minutes, 1.34 g. of pulverized potassium hydroxide are added. The solution is slowly heated to 150° in an oil bath and then heating at this temperature is continued for one hour. The solution is then cooled and poured onto ice. The resulting mixture is acidified with concentrated hydrochloric acid and extracted with ether. The ether solution is separated and extracted twice with 2 N sodium carbonate solution. The sodium carbonate solutions are combined and acidified with 2 N hydrochloric acid. The oil which precipitates is extracted with ether. The ether solution is washed with water, dried over sodium sulfate and concentrated at 40° under 11 torr. The residue is crystallized twice from ether/petroleum ether. The product [alternatively named as o-(2,6-xylidino)-phenylacetic acid] melts at 120–127° with decomposition.

Similarly prepared are:

(c) 2 - (2,6 - dichloroanilino)phenylacetic acid, M.P. 156–158° from ethyl ether/petroleum ether;

(e) 2-(2-methoxy-5-methylanilino)phenylacetic acid, M.P. 98–99° from ethyl ether/petroleum ether;

(f) 2-(2,6-dimethylanilino)-5-methylphenylacetic acid, M.P. 88–89° from ethyl acetate/petroleum ether.

EXAMPLE 12

2-(2,6-dimethylanilino)phenyl acetic acid (A) 2-(2,6-dimethylanilino)phenylglyoxylic acid: A solution consisting of 7.3 g. of 1-(2,6-dimethylphenyl) indol-2,3-dione, 15 ml. of 2 N sodium hydroxide solution and 100 ml. of ethanol is refluxed for 15 hours. The solution is then cooled and concentrated to dryness under 11 torr at 40°. The residue is dissolved in 200 ml. of water. The aqueous solution is extracted with ether, separated and acidified by adding 2 N hydrochloric acid. The yellow crystals which precipitate are disolsved in ether. The ether solution is separated, extracted with water, dried over sodium sulfate and concentrated under 11 torr at 40°. The residue is crystallized from ether/petroleum ether to yield 2-(2,6-dimethylanilino)phenylglyoxylic acid, M.P. 135–137°.

Similarly from 1-(2 - chloro-5-trifluoromethylphenyl)-indol-2,3-dione [see Example 11D (a)], 1-(2-chloro-6-methylphenyl)indol-2,3-dione [see Example 11D (b)], 1-(2,6 - dichloro-3-methylphenyl)indol-2,3-dione [see Example 11D (d)] and 1-(2,6-dimethylphenyl)-5-methylindol-2,3-dione [see Example 11D (f)] are prepared:

(a) 2-(2-chloro - 5 - trifluoromethylanilino)phenylglyoxylic acid;

(b) 2-(2-chloro-6-methylanilino)phenylglyoxylic acid;

(d) 2-(2,6-dichloro - 3 - methylanilino)phenylglyoxylic acid, M.P. 153–158° from ether;

(e) 2-(2,6-dimethylanilino) - 5 - methylphenylglyoxylic acid, M.P. 127° from ethyl acetate/petroleum ether.

(B) 2-(2,6-dimethylanilino)phenylacetic acid: To a solution of 1.5 g. of 2-(2,6-dimethylanilino)phenylglyoxylic acid in 10 ml. of anhydrous ethanol are added 2.25 g. of hydrazine hydrate. After the solution has cooled again to room temperature, a solution of 2.25 g. of sodium in 55 ml. of anhydrous ethanol is added. The mixture is slowly heated to 200°, whereby ethanol, water and hydrazine evaporate, leaving a crystalline residue which is kept at 200° for 15 minutes longer, then cooled. The residue is dissolved in 20 ml. of water; the solution is filtered through Hyflo and acidified with 2 N hydrochloric acid. The oil which precipitates is dissolved in ether. The ether solution is washed with 2 N potassium carbonate solution and water, the aqueous alkaline solution is separated and acidified with 2 N hydrochloric acid. The oil which precipitates is extracted with ether. The ether solution is washed with water, dried over sodium sulfate and concentrated under 11 torr at 40°. The residue is crystallized twice from ether/petroleum ether to yield the product, M.P. 120–127° (dec.).

Similarly obtained are:
 (a) 2-(2-chloro-5 - trifluoromethylanilino)phenylacetic acid, M.P. 94–96° from ethyl ether/petroleum ether;
 (b) 2-(2-chloro - 6 - methylanilino)phenylacetic acid, M.P. 140–147° from ether;
 (d) 2-(2,6 - dichloro - 3 - methylanilino)phenylacetic acid;
 (e) 2-(2,6 - dimethylanilino) - 5 - methylphenylacetic acid, M.P. 88–89° from ethyl acetate/petroleum ether.

EXAMPLE 13

2-(2,6-dichloroanilino)-5-chlorophenylacetic acid

Two hundred twenty grams of 2,6-dichloro-acetanilide are dissolved in 1000 ml. of 4-bromo-chlorobenzene. One hundred grams of anhydrous potassium carbonate and 10 g. of copper powder are added. The mixture is then refluxed for 4 days and the water which is formed is separated by means of a water separating apparatus. The mixture is then cooled and subjected to steam distillation. The residue is extracted with 2500 ml. of ether. The ether solution is filtered through Hyflo and concentrated to dryness under 11 torr. The residue is then dissolved in 1400 ml. of 10% ethanolic potassium hydroxide solution and the solution is refluxed for 16 hours. The solution is then concentrated to dryness under 11 torr at 50°. The residue is mixed with 150 ml. of water and extracted with 1500 ml. of ethyl acetate. The ethyl acetate solution is separated, dried with sodium sulfate and concentrated to dryness under 11 torr. The residue is distilled under high vacuum to yield N-(4-chlorophenyl) - 2,6 - dichloroaniline, B.P. 123–125°/0.01 torr [see Example 1A (c)]. Upon subjecting this to the procedures of Parts C and D of Example 11, there is obtained 1-(2,6-dichlorophenyl)-5-chloro-indol-2,3-dione which is then subjected to the procedures of Example 13 to yield 2 - (2,6 - dichloroanilino)-5-chlorophenylacetic acid, M.P. 181–183°.

EXAMPLE 14

2-(2,6-dimethylanilino)-5-methylphenylacetic acid sodium salt

A solution of 26.9 g. of 2 - (2,6-dimethylanilino)-5-methylacetic acid in 100 ml. of 1 N sodium hydroxide is concentrated to dryness under 11 torr with a bath temperature of 50°. The residue is mixed with 40 ml. of absolute benzene, again concentrated to dryness and the residue crystallized from dioxane. The sodium salt melts at 341–343°.

In an analogous manner, is obtained 2-(2,6-dimethylanilino)phenylacetic acid sodium salt, M.P. 298–305° (with decomposition) recrystallized from water.

EXAMPLE 15

2-(2,6-dichloroanilino)phenylacetic acid

A solution of 1 g. of methyl 2-(2,6-dichloroanilino)-phenylacetate in 20 ml. of methanol and 5 ml. of 2 N potassium bicarbonate solution is refluxed for 15 hours. It is concentrated to dryness in vacuo, diluted with 70 ml. of water and the aqueous solution is extracted with 20 ml. of ether. The aqueous solution is acidified with 2 N hydrochloric acid, the oil which separates is extracted with ether and the ether solution is washed with water, dried over sodium sulfate and concentrated, without heating, under 11 torr. The product is crystallized from ether/petroleum ether, M.P. 156–158°. The yield is 75% of theoretical.

Ethyl 2 - (2,6-dichloroanilino)phenylacetate, M.P. 50–52° can be saponified in the same way.

Alternatively, a solution of 0.5 g. of methyl 2-(2,6-dichloroanilino)phenylacetate in 40 ml. of 75% ethanol and 12 g. of Dowex 1 ion exchanger (OH⁻ form, 20–50 mesh) are stirred for 15 hours in a round flask at 50° and then filtered. The residue is suspended in 20 ml. of water and the suspension is acidified at 5° with 1 N hydrochloric acid. 30 ml. of ether are added, the whole is shaken and the ether solution is separated. The ether solution is washed with 10 ml. of water, dried over sodium sulfate and, when cold, is concentrated to dryness under 11 torr. The product is crystallized from ether/petroleum ether, M.P. 156–158°. The yield is 45% of theoretical.

EXAMPLE 16

2-(2,6-dichloroanilino)phenylacetic acid

To a solution of 1.2 g. of benzyl 2-(2,6-dichloroanilino)-phenylacetate in 50 ml. of ethanol are added 0.2 g. of 5% palladium charcoal. The solution is then hydrogenated at room temperature and low pressure. The hydrogenation is complete after 1¼ hours. The catalyst is filtered off and the filtrate is concentrated to dryness at room temperature about 11 torr. The residue is recrystallized from ether/petroleum ether to yield the product, M.P. 156–158°. The yield is 67% of theoretical.

EXAMPLE 17

2-[3,5-bis(trifluoromethyl)amino]phenylacetic acid (A) 2-[3,5-bis(trifluoromethyl)anilino]benzoic acid: A mixture of 710 g. of o-chlorobenzoic acid and 298 g. of 85% potassium hydroxide in 2500 ml. of n-pentanol is heated with stirring to 160° (bath temperature). During 30 minutes approximately 1000 ml. of n-pentanol are distilled off. To this mixture is then added 1560 g. of 3,5-bis-(trifluoromethyl)aniline and 17 g. of copper powder are then added and the mixture is refluxed for 15 hours. After cooling, the mixture is poured into a solution of 244 g. of sodium carbonate in 2000 ml. of water. The resulting solution is distilled with steam. After the excess 2,5-bis(trifluoromethyl)aniline has been removed by distillation, active charcoal is added to the aqueous solution, which is then filtered over Hyflo. The filtrate is acidified with concentrated hydrochloric acid. The crystals which precipitate are removed by filtration and slurried in 10 liters of hot water, then filtered and the filter residue is crystallized from ethanol to yield the intermediate [alternatively named as N-(α,α,α,α',α'-hexafluoro-3,5-xylyl)-anthranilic acid] which melts at 195–197°.

(B) N-phenyl - 3,5 - bis(trifluoromethyl)aniline: One hundred grams of 2-[3,5-bis(trifluoromethyl)anilino] benzoic acid are heated for one hour to 280°. The cooled melt is dissolved in 500 ml. of ether. The ether solution is extracted twice with 200 ml. of 2 N potassium bicarbonate solution and 50 ml. of water. The ether solution is then separated by filtration, dried over sodium sulfate and concentrated to dryness under 11 torr. The residue is distilled to yield the intermediate [alternatively named as α,α,α,α',α'-hexafluoro - N - phenyl-3,5-xylidine] as a yellow oil, B.P. 89–91°/0.001 torr. Upon standing, the oil crystallized, 82–83°.

(C) N - phenyl-3,5-bis(trifluoromethyl)oxaniloyl chloride: One hundred thirteen milliters of oxalyl chloride are added dropwise at 5° during 1 hour to a solution of 72 g. of N-phenyl-3,5-bis(trifluoromethyl)aniline in 450 ml. of anhydrous benzene. The solution is then stirred for 40 minutes at 56–60°. The reaction solution is cooled to room temperature and concentrated to dryness under 11 torr and with a bath temperature of 40°. The residue is dissolved in 250 ml. of anhydrous benzene and the solution again concentrated to dryness under 11 torr. The N-phenyl - 3,5 - bis(trifluoromethyl)oxaniloyl chloride remains as an orange-colored oil.

(D) 1 - [3,5 - bis(trifluoromethyl)phenyl]indol-2,3-dione: To a solution of 97 g. of N-phenyl-3,5-bis(trifluoromethyl)oxaniloyl chloride in 930 ml. of anhydrous tetrachloroethane are added in 33.4 g. of pulverized aluminum chloride. The mixture is then stirred for 20 hours at room temperature. The reaction mixture is then poured onto a mixture of 500 g. of ice and 500 ml. of 2 N hydrochloric acid and well shaken. The tetrachloroethane solution is separated, shaken with 200 ml. of water and then with 200 ml. of 2 N carbonate solution, dried over sodium sulfate and concentrated by evaporation under 11 torr with a bath temperature of 70°. The residue is crystallized from ethanol. The product [alternatively named as 1-($\alpha,\alpha,\alpha,\alpha',\alpha',\alpha'$-hexafluoro-3,5-xylyl) - indol-2,3-dione] melts at 118–119°.

(E) 2 - [3,5-bis(trifluoromethyl)anilino]phenylacetic acid: Eight grams of hydrazine hydrate are added at 50° to a solution of 7.2 g. of 1-[3,5-bis(trifluoromethyl)phenyl]-indol-2,3-dione in 30 ml. of ethanol. The yellow solution is then cooled to room temperature and a sodium ethoxide solution prepared from 8 g. of sodium and 80 ml. of aqueous ethanol is added. The solvent is slowly distilled off with the introduction of dry nitrogen and with a bath temperature of 100°. The bath temperature is slowly increased to 130° and the solvent completely distilled off. The crystalline residue is dissolved in 300 ml. of water. The aqueous solution is extracted with ether, separated and acidified with 2N hydrochloric acid. The obtained oil is extracted with ether. The ether extract is washed with water, dried over sodium sulfate and concentrated to dryness at room temperature under 11 torr. The residue is crystallized from ether/petroleum ether. The product [alternatively named as o-($\alpha,\alpha,\alpha,\alpha',\alpha',\alpha'$-hexafluoro-3,5-xylidino)phenylacetic acid melts at 124–129° with decomposition.

The crystalline sodium salt of 2-[3,5-bis(trifluoromethyl)anilinophenyl]acetic acid is obtained by reacting an ethanolic solution of the acid with an equimolar amount of 2 N sodium hydride evaporating to dryness and recrystallizing from dioxane.

The following prescriptions further illustrate the production of tablets and dragees:

EXAMPLE 18

One kilogram of 2-(2,6-dichloro - 3 - methylanilino)-phenylacetic acid are mixed with 550.0 g. of lactose and 292.0 g. of potato starch, the mixture is moistened with an alcoholic solution of 8.0 g. of gelatin and granulated through a sieve. After drying 60.0 g. of potato starch, 60.0 g. of talcum, 10.0 g. of magnesium stearate and 20.0 g. of colloidal silicium dioxide are mixed in and the mixture is pressed into 10,000 tablets, each weighing 200 mg. and containing 100 mg. of active substance. The tablets can be grooved for better adaption of the dosage.

EXAMPLE 19

Two hundred grams of 2-(2,6-dichloro-3-methylanilino)phenylacetic acid are well mixed with 16 g. of maize starch and 6.0 g. of colloidal silicium dioxide. The mixture is moistened with a solution of 2.0 g. of stearic acid, 6.0 g. of ethyl cellulose and 6.0 g. of stearin in about 70 ml. of isopropyl alcohol and granulated through a sieve III (Ph. Helv. V). The granulate is dried for about 14 hours and then passed through sieve III–IIIa. It is then mixed with 16.0 g. of maize starch, 16.0 g. of talcum and 2.0 g. of magnesium stearate and pressed into 1000 dragee cores. These are coated with a concentrated syrup from 2.000 g. of shellac, 7.500 g. of gum arabic, 0.150 g. of dyestuff, 2.000 g. of highly dispersed silicium dioxide, 25.000 g. of talcum and 53.350 g. of sugar and dried. The dragees obtained each weigh 360 mg. and contain 200 mg. of active substance.

EXAMPLE 20

One kilogram of methyl-2-(2,6-dichloro - 3 - methylanilino)phenylacetate are mixed with 550.0 g. of lactose and 292.0 g. of potato starch. The mixture is moistened with an alcoholic solution of 8.0 g. of gelatin and granulated through a sieve. After drying, 60.0 g. of potato starch, 60.0 g. of talcum, 10.0 g. of magnesium stearate and 20.0 g. of colloidal silicon dioxide are mixed in, and the mixture is pressed into 10,000 tablets, each weighing 200 mg. and containing 100 mg. of active substance. If desired, the tablets can be grooved for better adaption of the dosage.

EXAMPLE 21

Two hundred grams of methyl-2-(2,6-dichloro-3-methylanilino)phenylacetate, 16 g. of maize starch and 6.0 g. of colloidal silicon dioxide are well mixed. The mixture is moistened with a solution of 2.0 g. of stearic acid, 6.0 g. of ethyl cellulose and 6.0 g. of stearin in about 70 ml. of isopropyl alcohol and granulated through a sieve. The granulate is dried for about 14 hours and then passed through another sieve. It is then mixed with 16.0 g. of maize starch, 16.0 g. of talcum and 2.0 g. of magnesium stearate and pressed into 1000 dragee cores. These are coated with a concentrated syrup made from 2.000 g. of shellac, 7.500 g. of gum arabic, 0.150 g. of dyestuff, 2.000 g. of highly dispersed silicon dioxide, 25.000 g. of talcum and 53.350 g. of sugar and dried. The dragees obtained each weigh 360 mg. and contain 200 mg. of active substance.

Dosage units for rectal administration are, for example, suppositories which consist of a combination of a compound of Formula I or a suitable salt thereof with a neutral fatty foundation, or also gelatin rectal capsules which contain a combination of an active substance or a suitable salt thereof with polyethylene glycols (Carbowaxes) of suitable molecular weight.

Ampoules for parenteral, particularly intramuscular, administration preferably contain a water soluble salt, e.g., the sodium salt, of a substituted phenylacetic acid falling under Formula I, in a concentration of, preferably, 0.5 to 5%, in aqueous solution, optionally together with suitable stabilizing agents and buffer substances.

One of the following prescriptions can be used for the production of sun-tan creams:

EXAMPLE 22

| | G. |
|---|---|
| 2-(2,6-dichloroanilino)phenylacetic acid | 1.0 |
| Paraffin oil, thinly liquid | 1.0 |
| Polyoxyethylene sorbitan monostearate | 2.0 |
| Polyoxyethylene sorbitol lanoline derivative | 1.5 |
| Sorbitol solution 70% | 3.0 |
| Stearic acid | 15.0 |
| Preservative and perfume | Q.s. |
| Water | Ad 100.0 |

EXAMPLE 23

| | G. |
|---|---|
| 2-(2,6-dichloroanilino)phenylacetic acid | 1.0 |
| Propylene glycol | 28.0 |
| Glycerine monostearate | 18.0 |
| Polyoxyethylene-sorbitan monolaurate | 8.0 |
| Thimerosal (solution 1:1000) | 1.0 |
| Perfume | Q.s. |
| Water | Ad 100.0 |

EXAMPLE 24

| | G. |
|---|---|
| Methyl-2-(2,6-dichloroanilino)phenylacetate | 1.0 |
| Paraffin oil, (thin liquid) | 1.0 |
| Polyoxyethylene-sorbitan monostearate | 2.0 |
| Polyoxyethylene-sorbitol-lanolin derivative | 1.5 |
| Sorbitol solution 70% | 3.0 |
| Stearic acid | 15.0 |
| Preservative and perfume | Q.s. |
| Water | Ad 100.0 |

EXAMPLE 25

| | G. |
|---|---|
| Ethyl 2-(2,6-dichloroanilino)penylacetate | 1.0 |
| Propylene glycol | 28.0 |
| Glycerine monostearate | 18.0 |
| Polyoxyethylene-sorbitan monolaurate | 8.0 |
| Thimerosal (solution 1:1000) | 1.0 |
| Perfume | Q.s. |
| Water | Ad 100.0 |

EXAMPLE 26

Twenty grams 2-[3,5-bis(trifluoromethyl)anilinophenylacetic acid are dissolved in a mixture of 232 ml. of 1 N sodium hydroxide solution and 500 ml. of boiled water free of pyrogen and the solution is made up to 2000 ml. with more of the same water. The solution is filtered, filled into 1000 ampoules of 2 ml. each and sterilized. Each 2 ml. ampoule contains 20 mg. of 2-[3,5-bis(trifluoromethyl)anilinophenylacetic acid as active ingredient in the form of the sodium salt.

What is claimed is:

1. A compound of the formula:

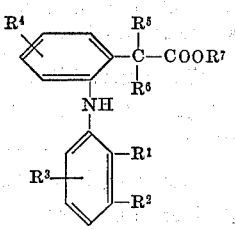

wherein:
$R^1$ is (lower)alkyl, (lower)alkoxy, fluoro or chloro; each of $R^2$ and $R^3$ is hydrogen, (lower)alkyl, chloro or fluoro;
$R^4$ is hydrogen, (lower)alkyl, (lower)alkoxy, chloro, fluoro or bromo;
$R^5$ is hydrogen or (lower)alkyl
$R^6$ is hydrogen, (lower)alkyl or when $R^5$ is hydrogen, benzyl; and
$R^7$ is hydrogen, (lower)alkyl or benzyl.

2. A compound according to claim 1 wherein $R^7$ is hydrogen.

3. A pharmaceutically acceptable salt of a compound according to claim 2 with a base.

4. A compound according to claim 1 wherein:
$R^1$ is lower alkyl or chloro;
$R^2$ is hydrogen, (lower)alkyl or chloro;
$R^3$ is hydrogen, chloro or (lower)alkyl in the 6'-position;
$R^4$ is hydrogen or chloro; and
each of $R^5$, $R^6$ and $R^7$ is hydrogen.

5. A compound according to claim 1 wherein:
$R^1$ is methyl;
$R^3$ is chloro in 6'-position; and
each of $R^2$, $R^3$, $R^4$, $R^5$, $R^6$ and $R^7$ is hydrogen.

6. A compound according to claim 1 wherein:
$R^1$ is chloro;
$R^2$ is methyl;
$R^3$ is chloro in 6'-position; and
each of $R^4$, $R^5$, $R^6$ and $R^7$ is hydrogen, and the sodium salt thereof.

7. A compound according to claim 1 wherein:
$R^1$ is chloro;
$R^3$ is chloro in 6'-position;
$R^4$ is chloro in 5-position; and
each of $R^2$, $R^5$, $R^6$ and $R^7$ is hydrogen; and the sodium salt thereof.

8. A compound according to claim 1 wherein:
$R^1$ is methyl;
$R^3$ is methyl in 6'-position; and
each of $R^2$, $R^4$, $R^5$, $R^6$, and $R^7$ is hydrogen; and the sodium salt thereof.

9. A compound according to claim 1 wherein:
$R^1$ is methyl;
$R^2$ is methyl; and
each of $R^3$, $R^4$, $R^5$, $R^6$ and $R^7$ is hydrogen.

10. A compound according to claim 1 wherein:
$R^1$ is chloro;
$R^3$ is chloro in 6'-position; and
each of $R^2$, $R^4$, $R^5$, $R^6$ and $R^7$ is hydrogen; and the sodium salt thereof.

11. A compound according to claim 1 wherein:
$R^1$ is methyl;
$R^2$ is chloro; and
each of $R^3$, $R^4$, $R^5$, $R^6$ and $R^7$ is hydrogen.

12. A compound according to claim 1 wherein:
$R^7$ is (lower)alkyl or benzyl.

13. A compound according to claim 1 wherein:
$R^1$ is (lower)alkyl or chloro;
$R^2$ is hydrogen or (lower)alkyl;
$R^3$ is hydrogen, (lower)alkyl or chloro in 6'-position;
$R^4$ is hydrogen or chloro;
each of $R^5$ and $R^6$ is hydrogen; and
$R^7$ is (lower)alkyl.

14. A compound according to claim 1 wherein:
$R^1$ is methyl;
$R^3$ is chloro in 6'-position,
$R^7$ is methyl; and
each of $R^2$, $R^4$, $R^5$ and $R^6$ is hydrogen.

15. A compound according to claim 1 wherein.
$R^1$ is chloro;
$R^3$ is chloro in 6'-position,
$R^7$ is methyl, and
each of $R^2$, $R^4$, $R^5$ and $R^6$ is hydrogen.

16. A compound according to claim 1 wherein:
$R^1$ is chloro;
$R^2$ is methyl;
$R^3$ is chloro in 6'-position,
$R^7$ is methyl, and
each of $R^4$, $R^5$ and $R^6$ is hydrogen.

17. A compound according to claim 1 wherein:
$R^1$ is chloro
$R^3$ is chloro in 6'-position,
$R^7$ is ethyl; and
each of $R^2$, $R^4$, $R^5$ and $R^6$ is hydrogen.

18. A compound according to claim 1 wherein:
$R^1$ is methyl;
$R^2$ is methyl;
$R^7$ is methyl; and
each of $R^3$, $R^4$, $R^5$ and $R^6$ is hydrogen.

19. A compound according to claim 1 wherein:
$R^1$ is methyl;
$R^2$ is chloro;
$R^7$ is methyl; and
each of $R^3$, $R^4$, $R^5$ and $R^6$ is hydrogen.

20. A compound of the formula:

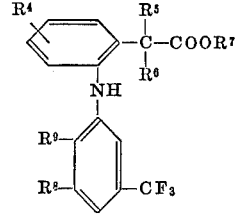

wherein:
$R^4$ is hydrogen, (lower)alkyl, (lower)alkoxy, chloro, fluoro or bromo;
$R^5$ is hydrogen or (lower)alkyl;
$R^6$ is hydrogen, (lower)alkyl or when $R^5$ is hydrogen, benzyl;

$R^7$ is hydrogen. (lower)alkyl or benzyl;
$R^8$ is hydrogen or trifluoromethyl; and
$R^9$ is hydrogen or chloro.

21. A compound according to claim 20 wherein each of $R^4$, $R^5$, $R^6$, $R^7$, $R^8$ and $R^9$ is hydrogen.

22. A compound according to claim 20 wherein each of $R^4$, $R^5$, $R^6$, $R^7$ and $R^8$ is hydrogen and $R^9$ is chloro.

23. The sodium salt of the compound according to claim 22.

24. A compound according to claim 20 wherein each of $R^4$, $R^5$, $R^6$, $R^7$ and $R^9$ is hydrogen and $R^8$ is trifluoromethyl.

25. A compound according to claim 20 wherein each of $R^4$, $R^5$, $R^6$ $R^8$ and $R^9$ is hydrogen and $R^7$ is methyl.

26. A compound according to claim 20 wherein each of $R^4$, $R^5$, $R^6$ and $R^8$ is hydrogen, $R^7$ is methyl and $R^9$ is chloro.

27. In the process for the production of a substituted phenyl acetic acid of the formula:

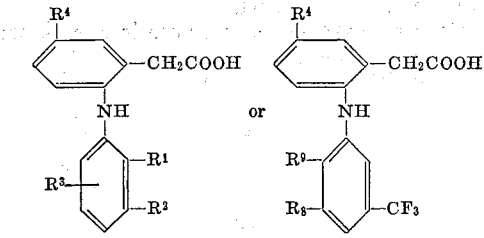

wherein:
$R^1$ is (lower)alkyl, (lower)alkoxy, fluoro or chloro;
each of $R^2$ and $R^3$ is hydrogen, (lower)alkyl, fluoro or chloro;
$R^4$ is hydrogen, (lower)alkyl, (lower)alkoxy, chloro, fluoro or bromo;
$R^8$ is hydrogen or trifluoromethyl; and
$R^9$ is hydrogen or chloro;
or a pharmaceutically acceptable salt thereof the steps which comprise treating (i) an indole-2,3-dione of the formula:

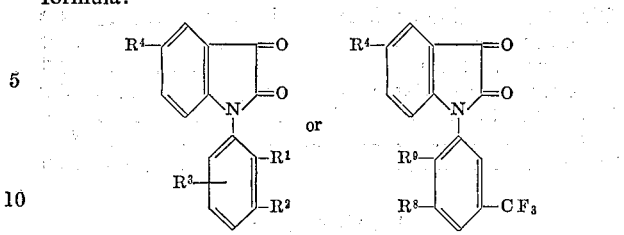

or (ii) an o-(amino)phenylglyoxylic acid of the formula:

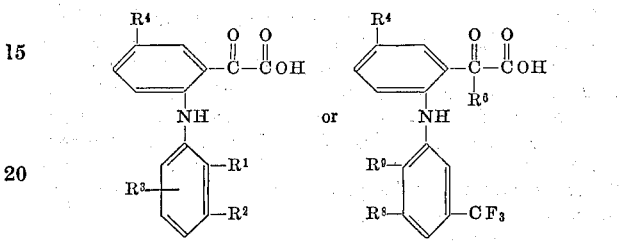

or a salt thereof wherein $R^1$, $R^2$, $R^3$, $R^4$, $R^8$ and $R^9$ are as defined above with hydrazine or semicarbazide and subjecting the reaction product to the action of an alkali metal hydroxide or alkali metal alkoxide.

References Cited
UNITED STATES PATENTS 3,413,313  11/1968  Scherrer _____ 260—471

JAMES A. PATTEN, Primary Examiner

L. THAXTON, Assistant Examiner

U.S. Cl. X.R.

260—247.2, 294, 326.11, 326.3, 465, 501.1, 501.11, 501.17, 518, 519, 544, 562, 571, 576; 424—60, 309, 317

Disclaimer 3,558,690.—*Alfred Sallmann*, Bottmingen and *Rudolf Pfister*, Basel, Switzerland. SUBSTITUTED DERIVATIVES OF 2-ANILINOPHENYL-ACETIC ACIDS AND A PROCESS OF PREPARATION. Patent dated Jan. 26, 1971. Disclaimer filed Oct. 22, 1984, by the assignee, *Ciba-Geigy Corp.*

Hereby enters this disclaimer to claims 1–5, 7–9, 11–14, 18–20, 24 and 27 of said patent.

[*Official Gazette December 11, 1984.*]